United States Patent
Roy et al.

(10) Patent No.: US 8,463,611 B2
(45) Date of Patent: Jun. 11, 2013

(54) METHOD AND SYSTEM FOR IMPROVING THE FIDELITY OF A DIALOG SYSTEM

(75) Inventors: Sumit Roy, Menlo Park, CA (US); Michael Harville, Palo Alto, CA (US); Michele Covell, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1754 days.

(21) Appl. No.: 10/965,540

(22) Filed: Oct. 13, 2004

(65) Prior Publication Data

US 2006/0080102 A1   Apr. 13, 2006

(51) Int. Cl.
   *G10L 13/08* (2006.01)
(52) U.S. Cl.
   USPC ........................................................ 704/260
(58) Field of Classification Search
   USPC .................................................... 379/100.15
   See application file for complete search history.

(56) References Cited

U.S. PATENT DOCUMENTS

| | | | |
|---|---|---|---|
| 5,995,590 A | 11/1999 | Brunet et al. | |
| 6,546,082 B1 * | 4/2003 | Alcendor et al. | 379/52 |
| 6,701,162 B1 * | 3/2004 | Everett | 455/556.1 |
| 7,254,227 B2 * | 8/2007 | Mumick et al. | 379/215.01 |

FOREIGN PATENT DOCUMENTS

| | | |
|---|---|---|
| JP | 2000-242642 | 8/2000 |
| JP | 2001-343993 | 12/2001 |
| JP | 2004-118720 | 4/2004 |
| JP | 2004-354760 | 12/2004 |
| JP | 2005-345681 | 12/2005 |
| KR | 2004-0073708 | 8/2004 |
| WO | WO 01/69595 | 9/2001 |

OTHER PUBLICATIONS

Masaru Ohki et al—"Sign Language Translation System Using Pattern Recognition and Synthesis"—Hitachi Review—vol. 44 No. 4—Aug. 1995 pp. 251-254.
Japan Application No. 2007-536748 Office Action dated Apr. 1, 2010.
Korean Patent Appln. No. 2007-7008312 office action dated Aug 7, 2008.

* cited by examiner

*Primary Examiner* — Leonard Saint Cyr

(57) ABSTRACT

Embodiments of the present invention recite a method and system for improving the fidelity of a dialog system. In one embodiment, a first input generated by a user of a first system operating in a first modality is accessed. In embodiments of the present invention, the first system also generates a first output corresponding to the first input. An second input from a second user, who is engaged in a conversation with the first user, is accessed by a second system. The second input is then utilized to modify the first output of the first system.

33 Claims, 8 Drawing Sheets

METHOD AND SYSTEM FOR IMPROVING THE FIDELITY OF A DIALOG SYSTEM

TECHNICAL FIELD

Embodiments of the present invention relate to the fields of text-to-speech systems and automatic speech recognition systems.

BACKGROUND ART

An increasing trend in communication technology is the combination of different communication modalities into a single multi-modal communication system. For example, a live chat between a first person using text messaging (e.g., at a computer terminal) and a second person who prefers speaking (e.g., while driving a car). Text typed by the first person using a text input device is converted using a text-to-speech (TTS) converter to audible speech. This can be heard on a speaker by the second person (e.g., using the ear piece of a cellular telephone). The second user speaks words or letters into a microphone (e.g., the mouthpiece of the cellular telephone). An automatic speech recognition (ASR) engine converts the spoken words to text which is then displayed to the first person.

However, multi-modal communication is difficult to implement. For example, it is difficult for some TTS systems to convert written text to correctly sounding speech. This problem is especially prevalent when converting proper names, and/or other words which are not in the vocabulary of the TTS conversion system. While some TTS systems can hypothesize how the word may be pronounced, they frequently fail to correctly approximate the proper pronunciation of the word. Additionally, when attempting to pronounce foreign words, the TTS system may fail to account for the cultural differences in pronouncing various letter combinations and/or the accenting and enunciation of the word.

Currently, much of the research in the field of ASR is still directed toward improving the recognition of a single user's speech. Another adaptation is directed toward compensating for environmental noise which can degrade the effectiveness of the ASR system in recognizing the user's speech. Other research in the field of ASR is directed toward recognizing the speech of non-native speakers of a language to improve the probability of recognizing their speech.

Another adaptation in ASR is to determine what subjects are being discussed and accessing dictionaries appropriate to the subject matter. Typically, recognition of the user's speech is based upon pre-guessing what the user is going to say. By accessing dictionaries which are more specific to a particular subject matter, the ASR system increases the probability values associated with each word in a particular dictionary. This increases the probability that when a user speaks, the ASR system will accurately recognize the user. For example, if a user is speaking about accounting, the ASR system accesses a dictionary comprising words about accounting, banking, money, etc. The ASR system then increases the probability value associated with each word in this dictionary as it is likely that the user will continue speaking about financial matters based upon the user's prior behavior. Thus, if the user speaks the word "tax," the ASR system will be more likely to interpret the word spoken by the user to be "tax" rather than the word "tacks."

ASR systems are increasingly being used in commercial applications such as voice mail systems. Often, the ASR system is configured to utilize a carefully worded hierarchy of questions which present the user with a narrow set of options from which to choose. Because the ASR system "knows" the likely answers in advance due to the wording of the questions, it can increase the probabilities of words which it expects to hear in response to the question asked. However, these systems often require lengthy configuration and training prior to implementation to minimize the error rate in recognizing the speech of a variety of users. Thus, these systems are expensive to set up, and are not readily adaptable to situations in which a carefully worded hierarchy of questions cannot be implemented.

DISCLOSURE OF THE INVENTION

Embodiments of the present invention recite a method and system for improving the fidelity of a dialog system. In one embodiment, a first input generated by a user of a first system operating in a first modality is accessed. In embodiments of the present invention, the first system also generates a first output corresponding to the first input. A second input from a second user, who is engaged in a conversation with the first user, is accessed by a second system. The second input is then utilized to modify the first output of the first system.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

MODES FOR CARRYING OUT THE INVENTION

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

NOTATION AND NOMENCLATURE

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "utilizing," "modifying," "substituting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
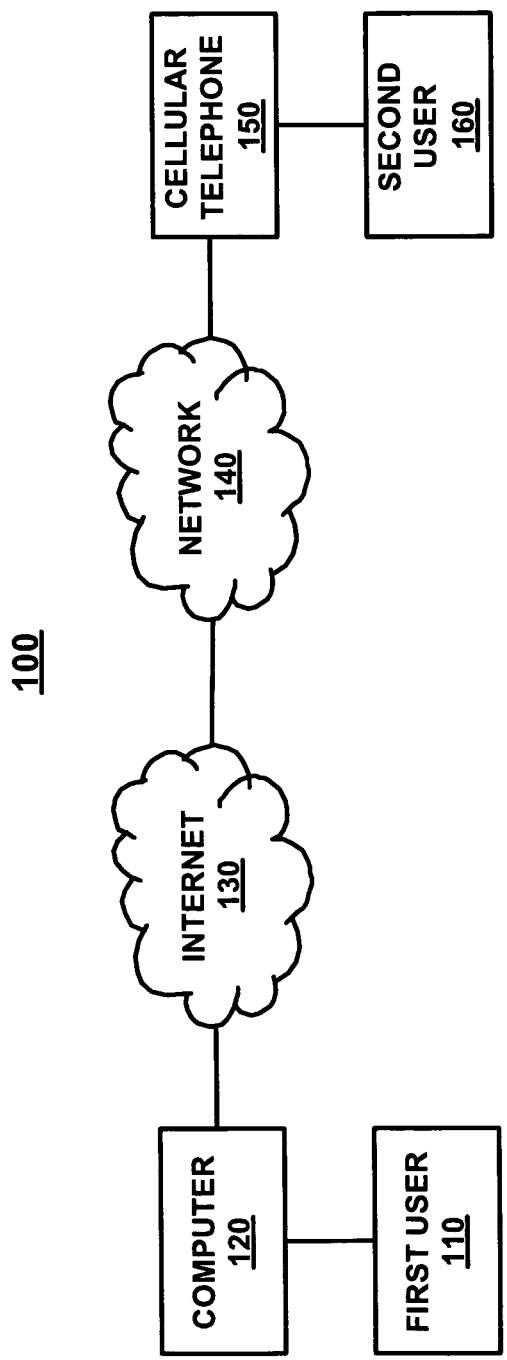
FIG. 1 is a diagram of a communications network used in accordance with embodiments of the present invention.

FIG. 1 is a diagram of a communications network 100 used in accordance with embodiments of the present invention. In FIG. 1, a first user 110 uses a computer 120 to communicate with a second user 160. In embodiments of the present invention, computer 120 is communicatively coupled with a cellular telephone 150 of second user 160 via one or more communication networks (e.g., Internet 130 and cellular telephone network 140). It is appreciated that other communication networks may be used in embodiments of the present invention including a public switched telephone network (PSTN), a Bluetooth communications network, etc. Embodiments of the present invention facilitate conversations between two or more users, one of whom may use a first system operating in a first modality (e.g., a text-to-speech system accessed by a computer, a personal digital assistant (PDA), or other text input/output device) and another user who uses a second system operating in a second modality (e.g., an automatic speech recognition system accessed by a telephone or other audio input/output device such as a dedicated ASR device). However, while the following discussion cites a text-to-speech system and an automatic speech recognition system specifically, embodiments of the present invention are not limited to these modalities alone. For example, input/output of embodiments of the present invention may be performed using a Braille input/output device. As described below, in other embodiments of the present invention, the first system comprises an automatic speech recognition system and the second system comprises a text-to-speech system.

FIGS. 2A, 2B, 2C and 2D are diagrams of embodiments of an exemplary dialog system 200 for facilitating a conversation in accordance with embodiments of the present invention. In embodiments of the present invention, communication between first user 110 and second user 160 is facilitated by conversation engine 210 which comprises a first system (e.g., text-to-speech system 211) and a second system (e.g., automatic speech recognition system 212) which are communicatively coupled with a modification component 214. In embodiments of the present invention, a plurality of hints 213 are accessed by conversation engine 210 to facilitate greater fidelity of text-to-speech system 211 and/or or of automatic speech recognition system 212. In embodiments of the present invention, hints 213 may be stored in a database which is a component of conversation engine 210, text-to-speech system (TTS) 211, automatic speech recognition (ASR) system 212, modification component 214, or may be a remotely accessed database that is accessed, for example, via a network connection.

It is appreciated that these components may be implemented on a single device (e.g., computer 120 or cellular telephone 150), or may be implemented in a distributed manner (e.g., a computer network). Additionally, conversation engine 210 may be implemented as a service provided by an Internet provider (not shown) via Internet 130, or by network 140 (e.g., a cellular network). In embodiments of the present invention, data is exchanged between text-to-speech system 211, automatic speech recognition system 212, and modification component 214 which is used to improve the fidelity of both systems. For the purpose of the present invention, this data is referred to as "hints" (e.g., 213 of FIG. 2).

As will be described below in detail, modification component 214 facilitates the fidelity of text-to-speech systems and of automatic speech recognition systems by accessing data from either system to improve upon the fidelity of the other system. As described above, generally, when two users are engaged in a conversation, they are typically talking about the same subject(s). Thus, in the embodiments of FIGS. 2A, 2B, 2C, and 2D, unrecognized words comprising text input 121 have a high probability of matching unrecognized words comprising the audio input 152.

As is discussed in greater detail below with reference to FIGS. 2A-2D, embodiments of the present invention utilize pre-defined parameters to determine when a given unrecognized text input corresponds to an unrecognized audio input. As a result, in embodiments of the present invention, text input 121 can be used to improve fidelity of text output 122 automatic speech recognition system 212. This is an example of a "hint" from text-to-speech system 211 being used to improve the fidelity of automatic speech recognition system 212. In another embodiment, an audio input (e.g., 152) may be used to improve the fidelity an audio output 151 of text-to-speech system 211. This is an example of a "hint" from the automatic speech recognition system being used to improve the fidelity of the text-to-speech system. It is appreciated that these embodiments are not mutually exclusive. In other words, conversation engine 210 may improve the fidelity of the text-to-speech system 211 and of automatic speech recognition system 212 during the same conversation.

Figure 2A:
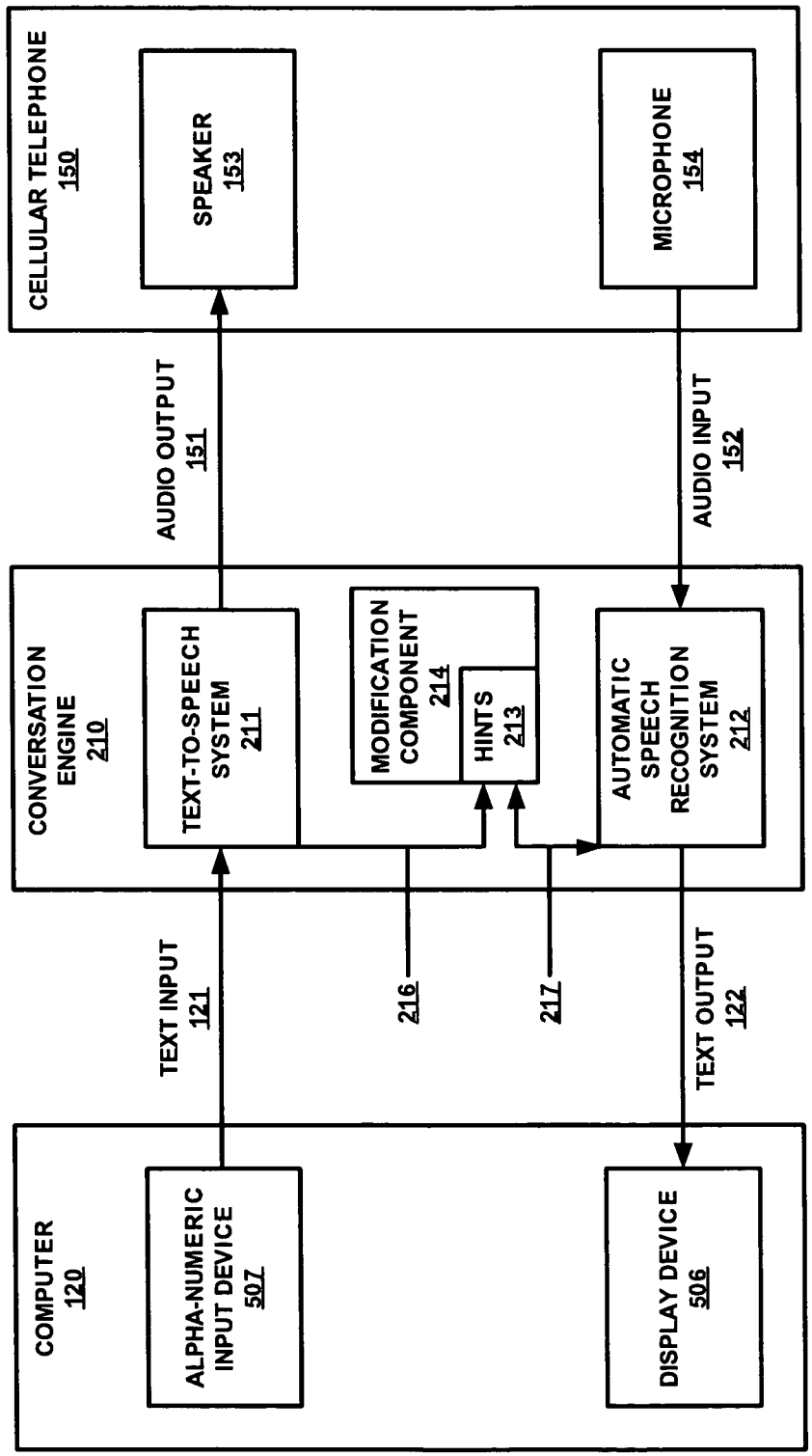
FIGS. 2A, 2B, 2C, and 2D are diagrams of exemplary dialog systems in accordance with embodiments of the present invention.
Figure 5:
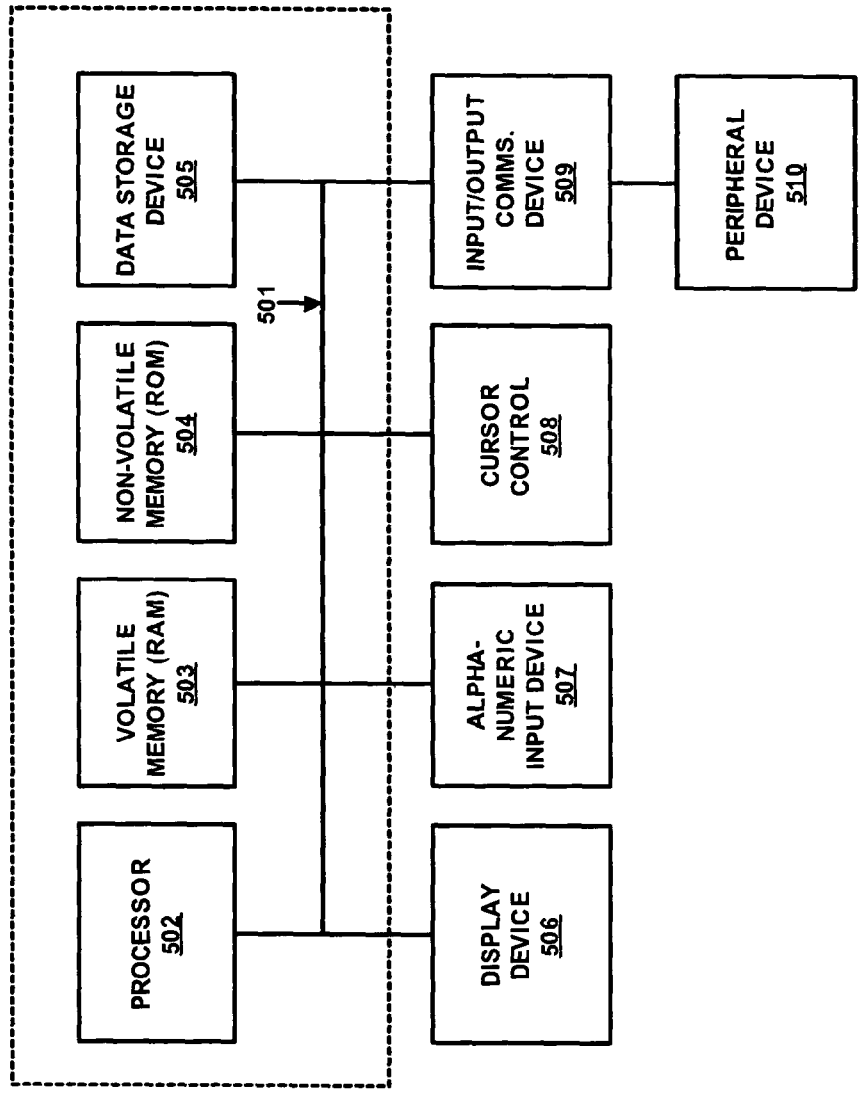
FIG. 5 is a diagram of an exemplary computer system upon which embodiments of the present invention may be implemented.

With reference to FIG. 2A, at a time $T_0$, first user 110 uses computer 120 to generate text input 121 (e.g., via alpha-numeric input device 507 of FIG. 5). In embodiments of the present invention, at a time $T_1$, text input 121 is accessed by text-to-speech system 211. Text-to-speech system 211 converts text input 121 into audio output 151 at a time $T_2$ which is conveyed to speaker 153 of cellular telephone 150 at a time $T_3$ as described above with reference to FIG. 1.

In response, at a time $T_4$, the user of cellular telephone 150 generates an audio input 152 which is received by conversation engine 210 at time $T_5$. Finally, at time $T_6$, automatic speech recognition system 212 generates text output 122 which is received at computer 120 at time $T_7$. It is appreciated that in embodiments of the present invention, the sequence of events may be reversed. That is, the generation of audio input 152 may precede the generation of text input 121 in embodiments of the present invention.

Figure 2B:
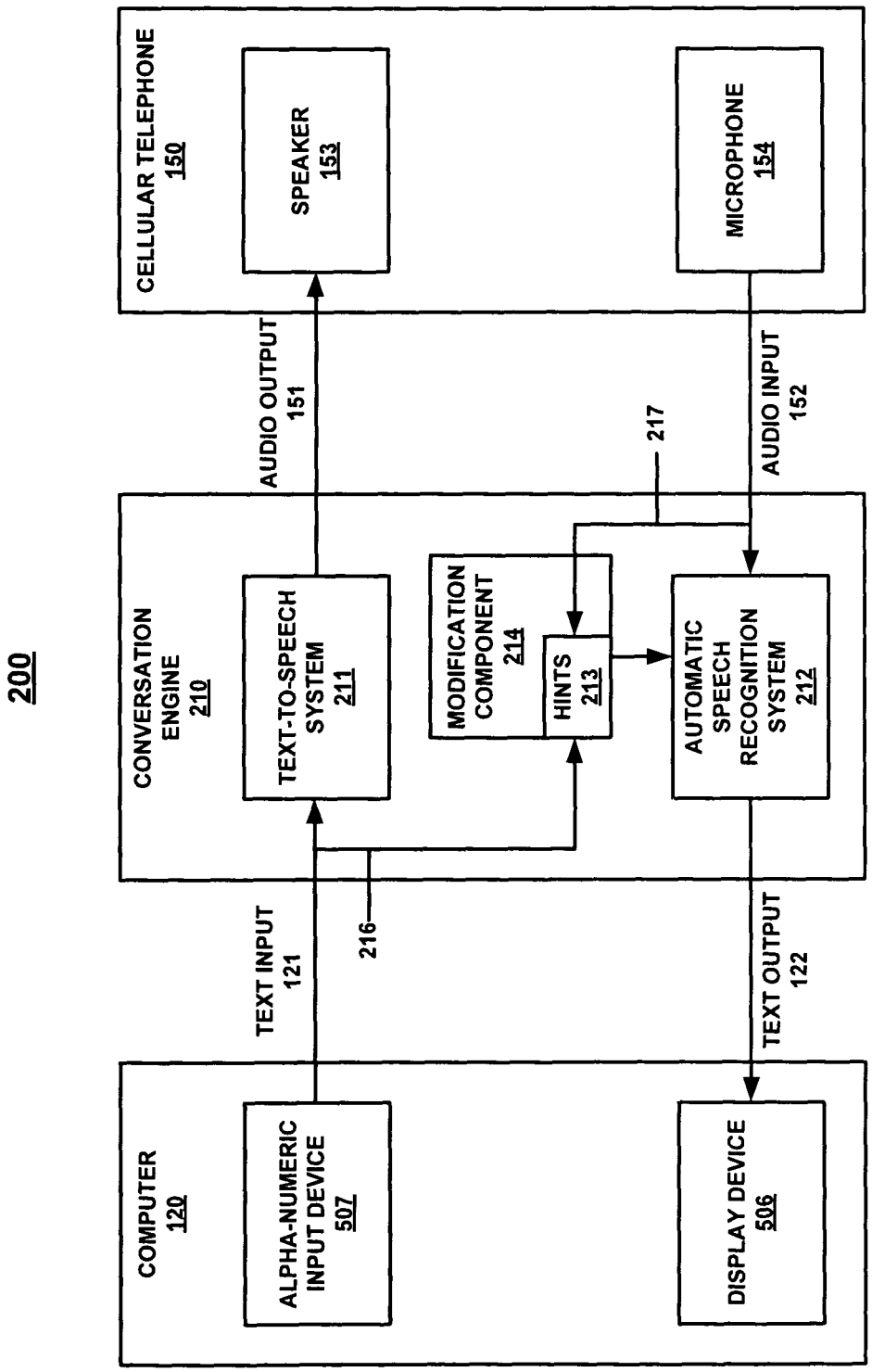

In embodiments of the present invention, when text input 121 and/or audio input 152 is accessed by conversation engine 210, the input is also accessed by modification component 214. In embodiments of the present invention, text input 121 may be received by modification component 214 via text-to-speech system 211 as shown in FIG. 2A, or modification component 214 may directly access text input 121 via coupling 216 as shown in FIG. 2B. Similarly, in embodiments of the present invention, audio input 152 may be received by modification component 214 via automatic speech recognition system 212 as shown in FIG. 2A, or modification component 214 may directly access audio input 152 via coupling 217 as shown in FIG. 2B.

Figure 2C:
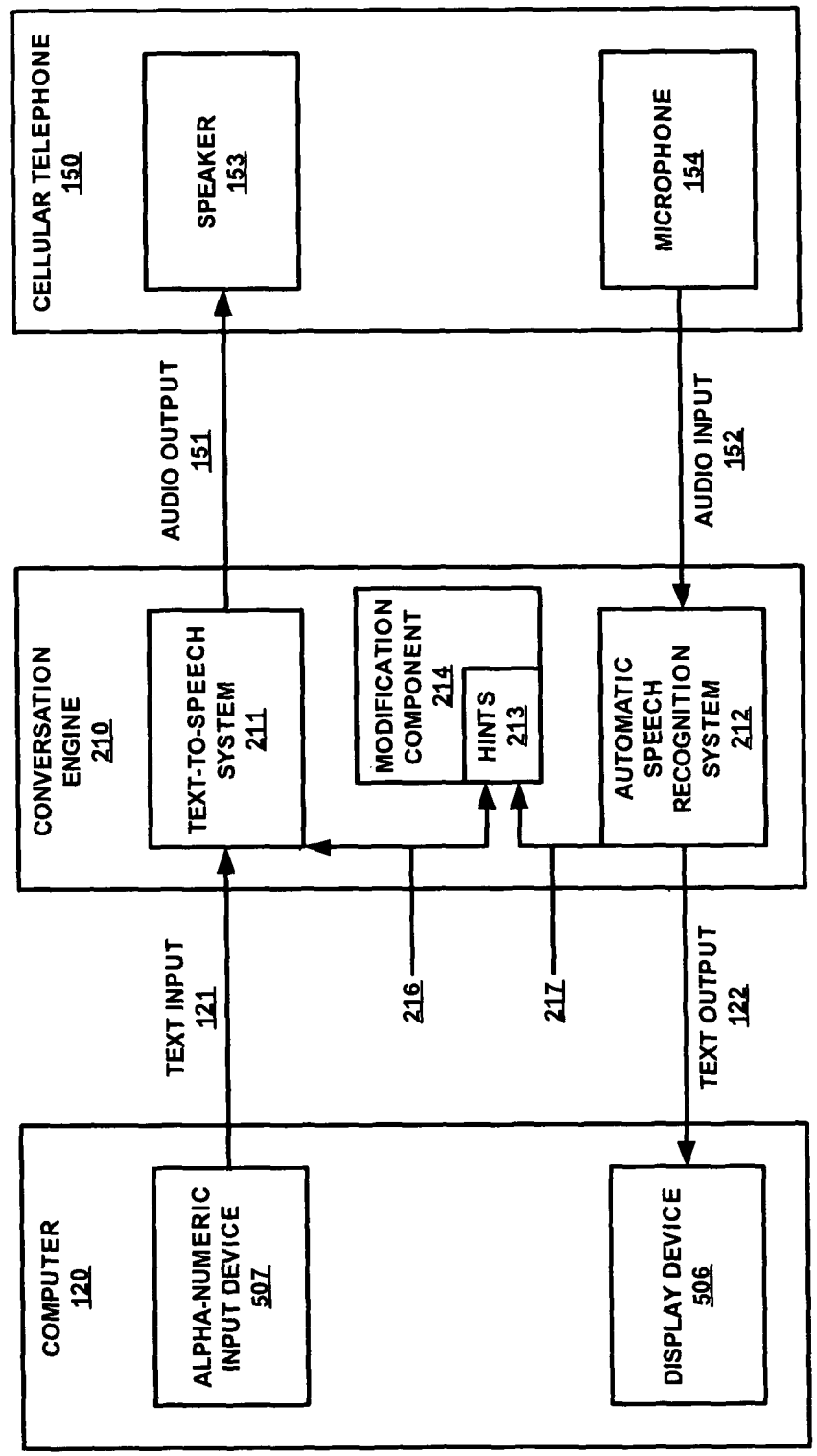
Figure 2D:
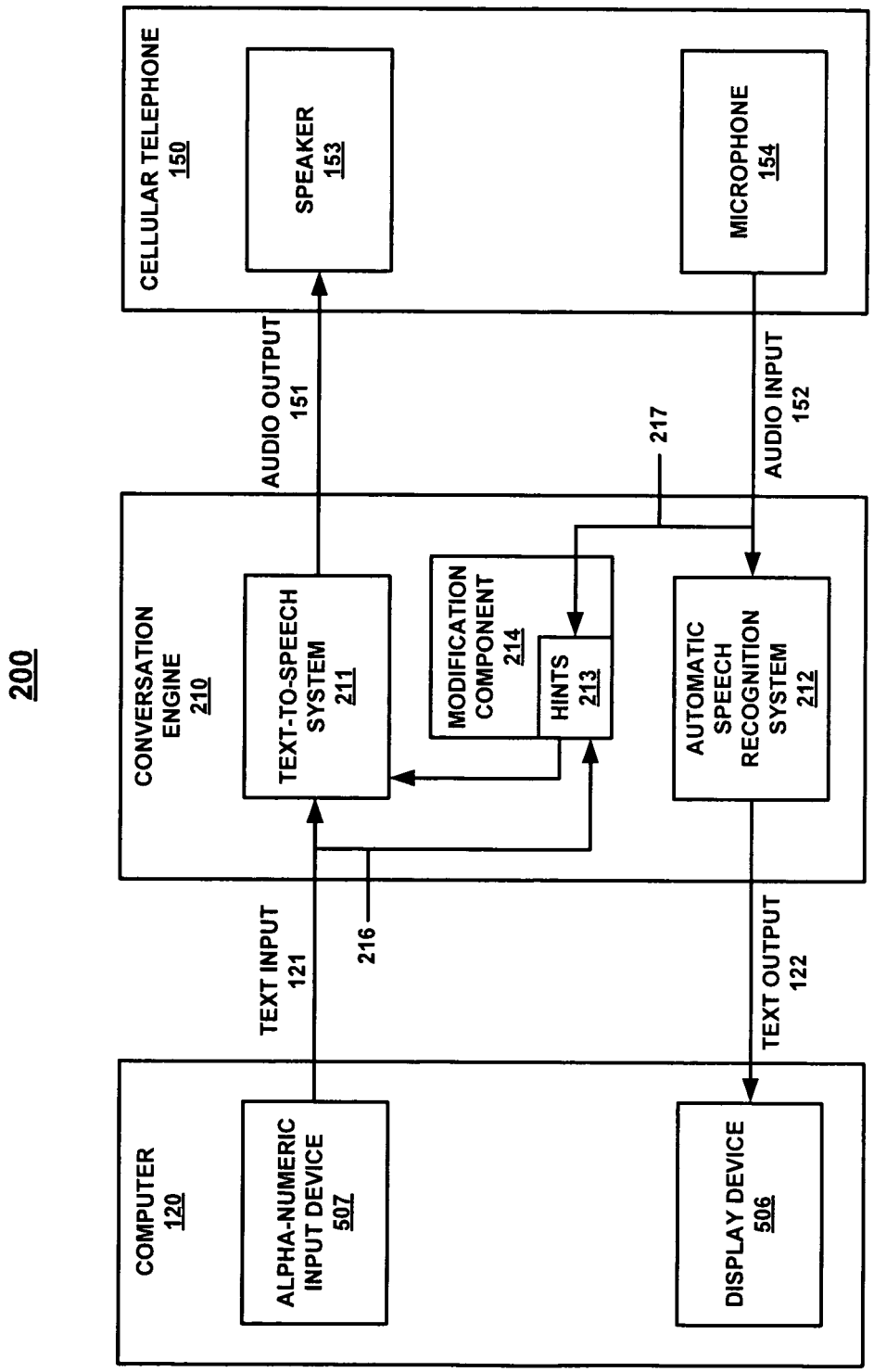
Figure 3:
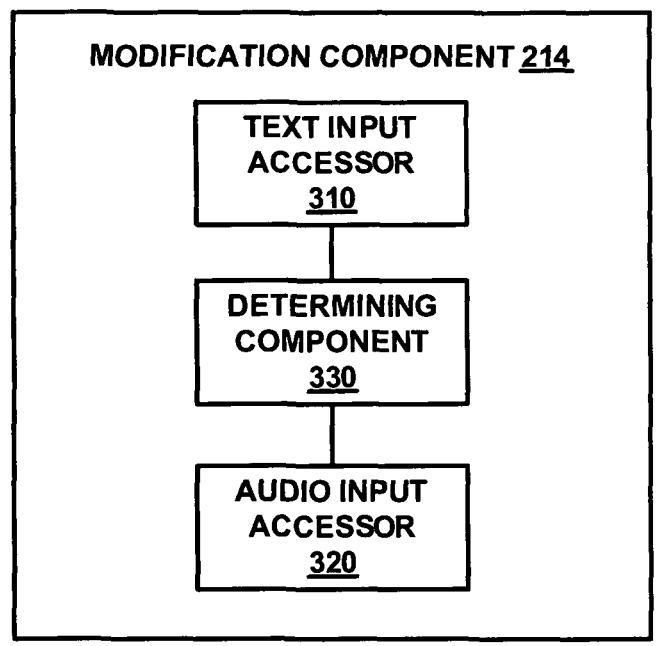
FIG. 3 is a block diagram of an exemplary modification component in accordance with embodiments of the present invention.

FIG. 3 is a block diagram of an exemplary modification component 214 in accordance with embodiments of the present invention. In embodiments of the present invention, modification component 214 comprises a first accessor (e.g., text input accessor 310) which is, in the present embodiment, configured to access text input 121. Modification component 214 further comprises second accessor (e.g., audio input accessor 320) which, in the present embodiment, is configured to access audio input 152. Additionally, modification component 214 comprises a database of hints (e.g., 213 of FIGS. 2A-2D). In the embodiment of FIG. 3, modification component 214 also comprises a database of hints 213. As described above, hints 213 may also be a database component of text-to-speech system 211, automatic speech recognition system 212, or a remotely accessed database that is accessible by conversation engine 210. In embodiments of the present invention, hints 213 may comprise a dictionary used by either or both of TTS system 211 and/or ASR system 212 when converting text-to-speech or speech-to-text. Additionally, in embodiments of the present invention hints 213 comprises associations of words which are not recognized by TTS system 211 and ASR system 212.

A determining component 330 is communicatively coupled with text input accessor 310 and audio input accessor 320 and, in the present embodiment, is configured to determine when an input from one modality corresponds with an input from another modality. For example, in the present embodiment, determining component 330 can determine that a given audio input 152 corresponds with a given text input 121. Determining component 330 is further for causing automatic speech recognition system 212 to use that text input (e.g., 121) in a process for constructing a text output (e.g., 122) for successive instances of the given audio input (e.g., 152).

In embodiments of the present invention, determining component 330 may also be used to cause text-to-speech system 211 to use an audio input (e.g., 152) in a process for constructing an audio output (e.g., 151) for successive instances of the given text input (e.g., 121). As shown in FIG. 2B, text input accessor 310 may be communicatively coupled directly with text input 121, or, as shown in FIG. 2A, with text-to-speech system 211. Similarly, audio input accessor 320 may be communicatively coupled directly with audio input 152 as shown in FIG. 2B, or with automatic speech recognition system 212, as shown in FIG. 2A.

Returning now to FIGS. 2A and 2B, in embodiments of the present invention, modification component 214 accesses the audio input 152 from cellular telephone 150 and determines whether an instance of audio input 152 corresponds to a text output 122. For example, in embodiments of the present invention, ASR system 212 accesses a dictionary stored in a database to match the audio input (e.g., 152) with a corresponding text output (e.g., 122). Thus, for each instance of audio input 152 received by the ASR system 212, a corresponding text output 122 is accessed and output. This text output is then sent to the recipient where it is displayed via display device 506 of computer 120 to first user 110.

In embodiments of the present invention, when automatic speech recognition system 212 receives an instance of audio input 152 which is not stored in the accessed dictionary, it generates a phonetic text output which approximates what the spelling of the word may be. As described above, conventional ASR systems often fail to correctly recognize words which have not been included in their dictionary. Thus, if the ASR system receives an instance of audio input with which it is not familiar, it can easily generate an incorrectly spelled text output of that word.

In the embodiments of FIGS. 2A and 2B, instances of audio input 152 which are not recognized by automatic speech recognition system 212 and/or modification component 214 are stored for later reference by modification component 214. In the embodiment of FIG. 2B, recognition of the audio input 152 is performed by modification component 214. Similarly, unrecognized instances of text input 121 are stored by modification component 214 for later reference. The instances of unrecognized audio input are then compared to instances of unrecognized text input. In embodiments of the present invention, modification component 214 then attempts to determine whether an instance of unrecognized text input (e.g., 121) corresponds to an instance of unrecognized audio input (e.g., 151). In embodiments of the present invention, pre-determined parameters are used by modification component 214 to determine if there is enough similarity between text input 121 and audio output 152 to designate them as corresponding instances of data.

For example, when an unrecognized instance of text input 121 is received, text-to-speech system 211 attempts to hypothesize a pronunciation of the word. This hypothesized pronunciation can be compared with an unrecognized audio input 152 to determine if there are enough similarities to assume that they actually refer to the same word. If it is determined that they do refer to the same word, modification component 214 updates the dictionary accessed by text-to-speech system 211 and/or automatic speech recognition system 212 so that the unrecognized instance of audio input 152 is now associated with the unrecognized instance of text input 121 (e.g., in hints 213). As a result, the next time the unrecognized instance of text input 121 is accessed by conversation engine 210, the associated audio input 152 is used as the audio output 151 of text-to-speech system 211. In embodiments of the present invention, a similar process can be used so that a text input from, for example, computer 120 can be used to modify the text output of automatic speech recognition system 212.

Embodiments of the present invention generally operate under the premise that two participants in a conversation are probably talking about the same subjects. Thus, unrecognized text input 121 and unrecognized audio input 152 may actually be referring to the same thing. Accordingly, in embodiments of the present invention, modification component 214 relies upon a set of parameters for matching an instance of unrecognized text input 121 with an instance of unrecognized audio input 152. If the two instances match within the defined parameters, modification component 214 assumes that the first user generating text input 121 and the second user generating audio input 152 are referring to the same thing. As a result, the dictionary (e.g., hints 213) accessed by text-to-speech system 211 and/or by automatic speech recognition system 212 is updated by modification component 214 so that text input 121 and audio input 152 are associated. In other words, the spelling of a given word of text input 121 is used as a hint for the spelling of a given word by ASR system 212.

Referring again to FIGS. 2A and 2B, the next time second user 160 generates audio input 152 at a time $T_N$, conversation engine 213 accesses audio input at time $T_{N+1}$ and compares the instance of unrecognized audio input 152 with a stored instance of text output 121. Upon determining that the unrecognized audio input 152 corresponds with the stored text input 121, modification component 214 causes automatic speech recognition system 212 to utilize the associated text input 121 as text output 122 at a time $T_{N+2}$ rather than approximating its own spelling of the audio input. As a result, the fidelity of automatic speech recognition system 212 is improved because it no longer approximates the spelling of words with which it is not familiar. Because the participants in the conversation are more likely to be familiar with the spelling or pronunciation of some words which may not be included in general purpose dictionaries, embodiments of the present invention use the spelling and/or pronunciation accessed by one system as a hint for improving the fidelity of the other system.

Additionally, depending upon words used in the conversation which are recognized by either text-to-speech system 211 and/or automatic speech recognition system 212, conversation engine 210 may perform a process called "dictionary adaptation" in which subject-specific dictionaries are accessed in response to either text input 121 or audio input 152. Typically, TTS systems associate a single audio output with a given text input, or in the case where a given text input can be pronounced in a variety of ways, natural language processing is performed to choose the most likely pronouncement of the text input. ASR systems typically rely upon dictionaries in which each word has a probability associated with the word based upon previously spoken words.

In embodiments of the present invention, conversation engine 210 may alter the probabilities of other words associated with either text input 121 or audio input 152. Thus, if the word "cat" is spoken, other words associated with the subject of cats will be assigned a higher probability by conversation engine 210. As a result, text input 121 can be used to modify the probabilities associated with words in the dictionary used by automatic speech recognition system 212. Similarly, audio input 152 can be used to modify the probabilities associated with words in the dictionary used by text-to-speech system 211. This is advantageous because, again, the participants in a conversation are likely to be discussing the same or similar subjects. Thus, the probability of related words being used during the conversation is greater.

In another embodiment, audio input 152 can be used to modify the audio output of text-to-speech system 211. In this embodiment, the next time text input 121 is accessed by text-to-speech system 211, instead of generating audio output 151, text-to-speech system 211 now outputs the audio input 152 which is associated with text input 121 in hints 213.

With reference to FIGS. 2C an 2D, at a time $T_0$, second user 160 uses cellular telephone 150 to generate audio input 152 (e.g., via microphone 154). In embodiments of the present invention, at a time $T_1$, audio input 152 is accessed by conversation engine 210. Automatic speech recognition system 212 converts audio input 152 into text output 122 at a time $T_2$ which is conveyed to display device 506 of computer 120 at a time $T_3$.

In response, at a time $T_4$, the user of computer 120 generates a text input 121 which is received by conversation engine 210 at time $T_5$. Finally, at time $T_6$, text-to-speech system 211 generates audio output 151 which is received at cellular telephone 150 at time $T_7$. It is appreciated that in embodiments of the present invention, the sequence of events may be reversed. That is, the generation of audio input 152 may precede the generation of text input 121 in embodiments of the present invention.

In embodiments of the present invention, instances of words which are not recognized by ASR system 212 are stored by conversation engine 210. In the embodiment of FIG. 2C, when ASR system 212 receives an instance of audio input with which it is not familiar, a copy of the audio input is sent to modification component 214 where it is stored. In the embodiment of FIG. 2D, when an instance of audio input 152 is not recognized by modification component 214, it is stored by modification component 214.

These instances of unrecognized audio input are then compared to instances of unrecognized text input. In embodiments of the present invention, modification component 214 then attempts to determine whether an instance of unrecognized text input (e.g., 121) corresponds to an instance of unrecognized audio input (e.g., 152). In embodiments of the present invention, pre-determined parameters are used by modification component 214 to determine if there is enough similarity between text input 121 and audio output 152 to designate them as corresponding instances of data.

If the two instances match within the defined parameters, modification component 214 assumes that the first user generating text input 121 and the second user generating audio input 152 are referring to the same thing. As a result, the dictionary (e.g., hints 213) accessed by text-to-speech system 211 and/or by automatic speech recognition system 212 is updated by modification component 214 so that text input 121 and audio input 152 are associated. In other words, the pronunciation of a given word of audio input 152 is used as a hint for the pronunciation of a given word by TTS system 211.

Referring again to FIGS. 2C and 2D, the next time first user 110 generates text input 112 at a time $T_N$, conversation engine 213 accesses text input 121 at time $T_{N+1}$, and compares the instance of unrecognized text input 121 with a stored instance of audio output 152. Upon determining that the unrecognized text input 121 corresponds with the stored audio input 152, modification component 214 causes text-to-speech system 211 to utilize the associated text input 152 as text output 122 at a time $T_{N+2}$ rather than approximating its own pronunciation of text input. 121, In this extension of the database (e.g., 213), the audio input 152 is characterized using whatever description language is appropriate for the basic TTS system. Typically, this is a sequence of phonemes with relative durations and stresses noted, instead of the original audio samples. However, this does not preclude the use of the original audio samples as the recorded representation. As a result, the next time text input 121 is accessed by text-to-speech system 211, instead of generating audio output 151 as before, text-to-speech system 211 now uses the recorded representation, generated from the audio input 152 (e.g., the associated audio input 152 stored in hints 213. If the recorded representation is the original audio input 152, that audio can be blended into the audio output, optionally with audio transformations to improve the perceptual match. An example of a possible transformation given in reference is, "Automatic Audio Morphing," by Slaney, Covell, and Lassiter, presented at the Institute of Electrical and Electronics Engineers (IEEE) International Conference on Acoustics, Speech, and Signal Processing, Atlanta Ga., May 1996, vol. 2, pages 1001-1004.

In another embodiment, modification component 214 can also be used to configure text-to-speech system 211 to generate audio output 151 in a manner which resembles the speech patterns of the user of cellular telephone 150. For example, if the user of cellular telephone 150 speaks with a distinct accent, modification component 214 can access audio input 152 and modify the pronunciation of the words comprising audio output 151 as described above. As a result, embodiments of the present invention can cause audio output 151 to more closely resemble the pronunciation of the words comprising audio input 152, including words which are correctly recognized by automatic speech recognition system 212.

In embodiments of the present invention, when TTS system 211 receives an instance of text input 121 which is not stored in the accessed dictionary, it generates a phonetic audio output which approximates what the word may sound like. As described above, conventional TTS systems often fail to generate a correct audio output for proper nouns which they have not been trained to pronounce. Thus, if the TTS system receives an instance of text input with which it is not familiar, it can easily generate an incorrect pronouncement of that word. This is especially problematic in that TTS systems often fail to account for cultural differences in pronouncing various letter combinations and/or the accenting and enunciation of foreign (e.g., non-English) words. In embodiments of the present invention, instances of words which are not recognized by text-to-speech system 211 are stored in hints 213.

Accordingly, embodiments of the present invention facilitate greater fidelity for text-to-speech system 211 because it is not required to guess or approximate the pronunciation of words with which it is not familiar. Similarly, embodiments of the present invention facilitate greater fidelity for automatic speech recognition system 212 because it is not required to guess or approximate the spelling of words with which it is not familiar. Additionally, using previously accessed text input, the probabilities of related words can be raised. As a result, the fidelity of automatic speech recognition system 212 in recognizing spoken words is enhanced.

The following discussion is an exemplary conversation using dialog system 200 in accordance with embodiments of the present invention. First user 110 generates a text input 121 asking second user 160, "What kind of cat did Joe get?" Conversation engine 210 accesses text input 121 and, using text-to-speech system 211, generates audio output 151 which is output to second user 160 as, "What kind of cat did Joe get?" Additionally, conversation engine 210 performs a dictionary adaptation process in which words associated with the word "cat" are given higher probabilities. Thus, if other words associated with the word "cat" such as paws, whiskers, longhair, short-hair, tabby, dog, mouse, bird, etc., are used by either first user 110 or second user 160, they will be more readily recognized by conversation engine 210.

In response to audio output 151, user 160 generates audio input 152, "Usiki is a Russian short-hair." Conversation engine 210 accesses audio input 152 and, using automatic speech recognition system 212, generates text output 122. However, because automatic speech recognition system 212 has not been trained to recognize the word "Usiki," it outputs an approximation. Thus, first user 110 receives text output 122 which is output as, "Oozeke is a Russian short-hair." Additionally, because the word "Usiki" is not typically found in English dictionaries, automatic speech recognition system 212 does not recognize the word. In embodiments of the present invention, the unrecognized word is then added to a dictionary by conversation engine 210. More specifically, audio input 152 (e.g., an audio file of the pronunciation of Usiki) is added to the dictionary (e.g., hints 213). In the same sentence, because conversation engine 210 has already performed dictionary adaptation, the phrase "short-hair" was correctly recognized instead of being incorrectly recognized as "shorter." Thus, conversation engine 210 used text input 121 to more correctly identify possible audio inputs. As a result, fidelity for automatic speech recognition system 212 is improved by embodiments of the present invention because a previously accessed text input can be used to modify the output of the automatic speech recognition system. In embodiments of the present invention, another dictionary adaptation process may be performed in which words associated with the word "Russian" are given higher probabilities.

First user 110, knowing that the cat being discussed is named Usiki, recognizes that text output 122 of Oozeke is a mis-spelling. First user 110 then generates a reply (e.g., text input 121), "Where did you find Usiki?", in which the word "Usiki" is correctly spelled. Because Usiki is not a word typically found in an English dictionary, conversation engine 210 adds the word Usiki to its dictionary (e.g., a text input of Usiki is added to hints 213). Additionally, conversation engine 210 attempts to match the text entry of Usiki (e.g., text input 121) with any audio files which may match the text entry according to pre-defined parameters for matching text and audio inputs. Thus, modification component determines that the text entry of Usiki matches the audio file (e.g., audio input 152) of Usiki. As a result, these two words are associated in the dictionary stored in hints 213. In embodiments of the present invention, when the word "Usiki," is next spoken in audio input 152, the associated text file for the word "Usiki" is accessed when text output 122 is generated. In other words, when the word "Usiki" is next used as audio input 152, the previously stored text input 121 typed by user 110 is used in a process for constructing a text output 122 from automatic speech recognition system 212 instead of the previously generated approximation.

Conversation engine 210 then accesses text input 121 (e.g., "What does Usiki mean?") and, using text-to-speech system 211, generates audio output 151 which is output to second user 160 as, "What does Usiki mean?" However, the pronunciation of "Usiki" output by conversation engine 210 substantially approximates the pronunciation previously input by second user 160.

Accordingly, embodiments of the present invention facilitate greater fidelity for automatic speech recognition system 212 because it is not required to guess or approximate the spelling of words with which it is not familiar. Additionally, using previously accessed text input, the probabilities of related words can be raised. As a result, the fidelity of automatic speech recognition system 212 in recognizing spoken words is enhanced.

Referring to the exemplary scenario described above, first user 110 may correctly spell "Usiki" when generating text input 121. However, because TTS system 211 does not have that word in its dictionary, it generates an audio output 151 which incorrectly pronounces "Usiki." Additionally, because the word "Usiki" is not recognized, it is stored by conversation engine 210 (e.g., by modification component 214).

Second user 160, knowing the correct pronunciation of "Usiki," generates an audio input 152 in which "Usiki" is correctly pronounced. Again, because the word "Usiki" is not recognized (e.g., by ASR system 212 or modification component 214), the audio representation of "Usiki" is stored by conversation engine 210.

In embodiments of the present invention, determining component 330 compares the text representation of "Usiki" with the audio representation of the word "Usiki" and determines that they are corresponding instances of the word. Determining component 214 then updates hints 213 so that the next time text input 121 comprises the word "Usiki," the associated audio file for the word "Usiki" is accessed via hints 213. In other words, when the word "Usiki" is next used as a text input 121, the previously stored audio output 152 spoken by user 160 is used in a process for constructing an audio output 151 from text-to-speech system 211 instead of the approximation previously generated by text-to-speech system 211.

Figure 4:
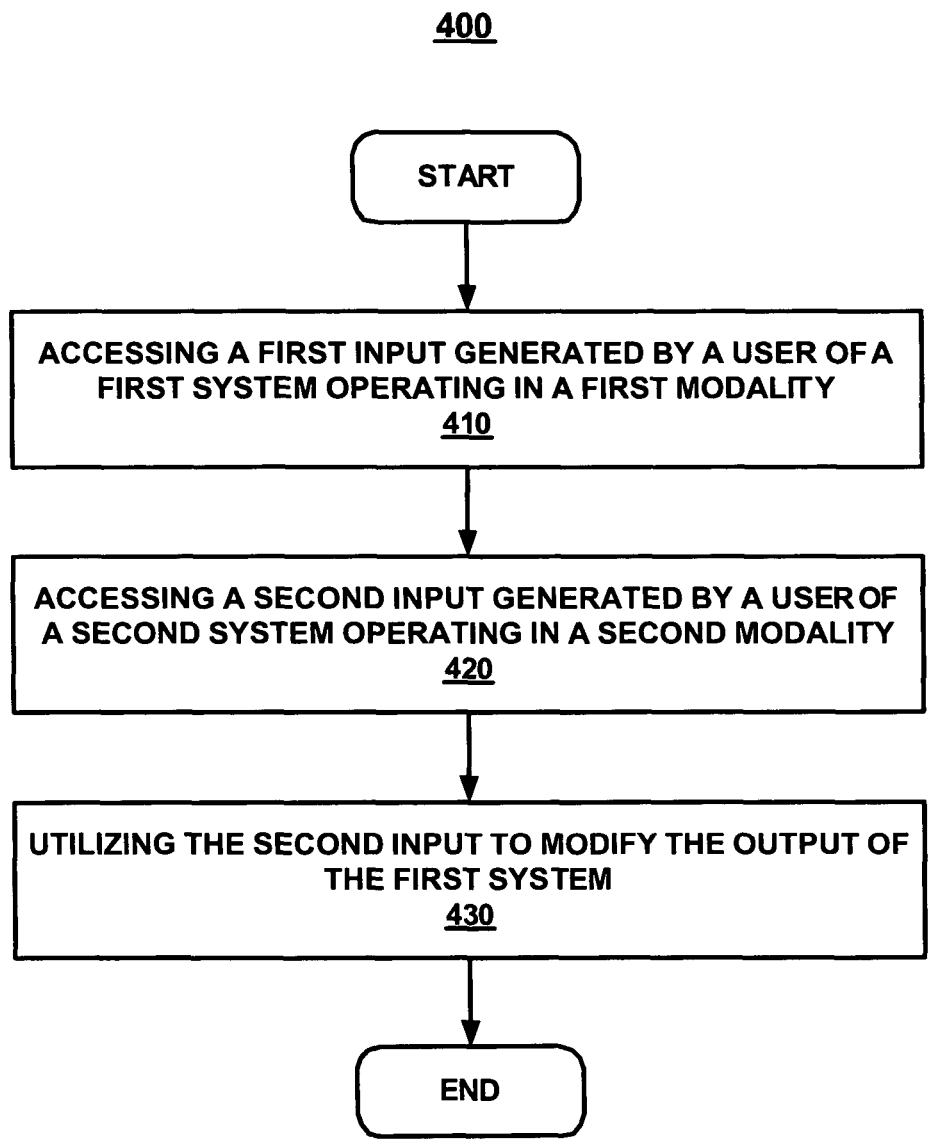
FIG. 4 is a flow chart of a method for improving the fidelity of a dialog system in accordance with embodiments of the present invention.

FIG. 4 is a flow chart of a method 400 for improving the fidelity of text-to-speech and automatic speech recognition systems in accordance with embodiments of the present invention. In step 410 of FIG. 4, a first input from a first user of a first system operating in a first modality is accessed. As described above with reference to FIG. 2, in embodiments of the present invention, modification component 214 accesses text input 121. In embodiments of the present invention, modification component 214 identifies instances of unrecognized text input and stores them in a dictionary (e.g., 215 of FIG. 2).

In step 420 of FIG. 4, a second input from a second user of a second system operating in a second modality is accessed. As described above with reference to FIG. 2, in embodiments of the present invention, modification component 214 also accesses audio input 152. In embodiments of the present invention, modification component 214 identifies instances of unrecognized audio input and stores them in a dictionary (e.g., 215 of FIG. 2).

In step 430 of FIG. 4, the second input is utilized to modify the output of the first system. As discussed above with reference to FIG. 2, modification component 214 is configured to determine when an instance of unrecognized text input corresponds to an instance of unrecognized audio input. In embodiments of the present invention, in response to determining this, modification component 214 causes text-to-speech system 211 to use audio input 152 in a process for constructing audio output 151 when the corresponding text input 121 is accessed. Additionally, modification component 214 can cause automatic speech recognition system 212 to use text input 121 as text output 122 as well.

With reference to FIG. 5, portions of the present invention are comprised of computer-readable and computer-executable instructions that reside, for example, in computer system 500 which is used as a part of a general purpose computer network (not shown). It is appreciated that computer system 500 of FIG. 5 is exemplary only and that the present invention can operate within a number of different computer systems including general-purpose computer systems, embedded computer systems, laptop computer systems, hand-held computer systems, and stand-alone computer systems.

In the present embodiment, computer system 500 includes an address/data bus 501 for conveying digital information between the various components, a central processor unit (CPU) 502 for processing the digital information and instructions, a volatile main memory 503 comprised of volatile random access memory (RAM) for storing the digital information and instructions, and a non-volatile read only memory (ROM) 504 for storing information and instructions of a more permanent nature. In addition, computer system 500 may also include a data storage device 505 (e.g., a magnetic, optical, floppy, or tape drive or the like) for storing vast amounts of data. It should be noted that the software program for performing a method for improving the fidelity of text-to-speech and automatic speech recognition systems of the present invention can be stored either in volatile memory 503, data storage device 505, or in an external storage device (not shown).

Devices which are optionally coupled to computer system 500 include a display device 506 for displaying information to a computer user, an alpha-numeric input device 507 (e.g., a keyboard), and a cursor control device 508 (e.g., mouse, trackball, light pen, etc.) for inputting data, selections, updates, etc. Computer system 500 can also include a mechanism for emitting an audible signal (not shown).

Returning still to FIG. 5, optional display device 506 of FIG. 5 may be a liquid crystal device, cathode ray tube, or other display device suitable for creating graphic images and alpha-numeric characters recognizable to a user. Optional cursor control device 508 allows the computer user to dynamically signal the two dimensional movement of a visible symbol (cursor) on a display screen of display device 506. Many implementations of cursor control device 508 are known in the art including a trackball, mouse, touch pad, joystick, or special keys on alpha-numeric input device 507 capable of signaling movement of a given direction or manner displacement. Alternatively, it will be appreciated that a cursor can be directed an/or activated via input from alpha-numeric input device 507 using special keys and key sequence commands. Alternatively, the cursor may be directed and/or activated via input from a number of specially adapted cursor directing devices.

Furthermore, computer system 500 can include an input/output (I/O) signal unit (e.g., interface) 509 for interfacing with a peripheral device 510 (e.g., a computer network, modem, mass storage device, etc.). Accordingly, computer system 500 may be coupled in a network, such as a client/server environment, whereby a number of clients (e.g., personal computers, workstations, portable computers, mini-computers, terminals, etc.) are used to run processes for performing desired tasks. In particular, computer system 500 can be coupled in a system for method for improving the fidelity of text-to-speech and automatic speech recognition systems.

The preferred embodiment of the present invention, a method and system for improving the fidelity of a dialog system, is thus described. While the present invention has been described in particular embodiments, it should be appreciated that the present invention should not be construed as limited by such embodiments, but rather construed according to the following claims.

What is claimed is:

1. A method for improving the fidelity of a dialog system, said method comprising:
   accessing a first input generated by a first instance of input by a user of a first system operating in a first modality, wherein said first system generates a first output corresponding to said first instance of input;
   accessing a second input generated by a user of a second system operating in a second modality, wherein said user of said first system and said user of said second system are engaged in a conversation;
   determining that said first input and said second input are unrecognizable;
   determining to treat said first input and said second input as the same word by comparing the first input and the second input with each other; and
   if it is determined to treat said first input and said second input as the same word, then utilizing said second input to modify subsequent output of said first system.

2. The method as recited in claim 1 wherein said first system comprises a text-to-speech system, said second system comprises an automatic speech recognition system, and wherein said utilizing comprises:

utilizing an audio input of said automatic speech recognition system to modify an audio output of said text-to-speech system.

3. The method as recited in claim 1 further comprising:
modifying a database, wherein a process selected from a group consisting essentially of dictionary adaptation and dictionary augmentation is performed.

4. The method as recited in claim 3 wherein said database comprises a component of said first system.

5. The method as recited in claim 3 wherein said database comprises a component of said second system.

6. The method as recited in claim 3 wherein said database comprises a common component of said first system and said second system.

7. The method as recited in claim 1 wherein said utilizing comprises:
substituting at least a portion of said subsequent output with said second input.

8. The method as recited in claim 1 wherein said first system comprises an automatic speech recognition system, said second system comprises a text-to-speech system, and wherein said utilizing comprises:
utilizing a text input of said text-to-speech system to modify a text output of said automatic speech recognition system.

9. A computer storage medium device having computer readable program code embodied therein for causing a computer system to perform a method for improving the fidelity of a dialog system, said method comprising:
accessing a first input generated by a first instance of input by a user of a first system operating in a first modality, wherein said first system generates a first output corresponding to said first instance of input;
accessing a second input generated by a user of a second system operating in a second modality, wherein said user of said first system and said user of said second system are engaged in a conversation;
determining that said first input and said second input are unrecognizable;
determining to treat said first input and said second input as the same word by comparing the first input and the second input with each other; and
if it is determined to treat said first input and said second input as the same word, then utilizing said second input to modify subsequent output of said first system.

10. The computer usable medium of claim 9 wherein said first system comprises a text-to-speech system, said second system comprises an automatic speech recognition system, and wherein said utilizing comprises:
utilizing an audio input of said automatic speech recognition system to modify an audio output of said text-to-speech system.

11. The computer usable medium of claim 9 wherein said method further comprises:
modifying a database, wherein a process selected from a group consisting essentially of dictionary adaptation and dictionary augmentation is performed.

12. The computer usable medium of claim 11 wherein said database comprises a component of said first system.

13. The computer usable medium of claim 11 wherein said database comprises a component of said second system.

14. The computer usable medium of claim 11 wherein said database comprises a common component of said first system and said second system.

15. The computer usable medium of claim 11 wherein said utilizing comprises:
substituting at least a portion of said subsequent output with said second input.

16. The computer usable medium of claim 9 wherein said first system comprises an automatic speech recognition system, said second system comprises a text-to-speech system, and wherein said utilizing comprises:
utilizing a text input of said text-to-speech system to modify a text output of said automatic speech recognition system.

17. A system for facilitating a conversation comprising:
a first system in a first modality for accessing a first input and generating a first output corresponding to said first input;
a second system in a second modality communicatively coupled with said first system and for accessing a second input and generating a second output corresponding to said second input;
a determining component for determining that said first input and said second input are unrecognizable and, determining to treat said first input and said second input as the same word by comparing the first input and the second input with each other; and
a modification component communicatively coupled with said second system and for if it is determined to treat said first input and said second input as the same word, then, modifying subsequent output of said first system based upon said second input to said second system.

18. The system of claim 17 wherein said first system comprises a text-to-speech system, said second system comprises an automatic speech recognition system, and wherein said modification component is for modifying an audio output of said text-to-speech system based upon an audio input of said automatic speech recognition system.

19. The system of claim 18 wherein said modification component causes said text-to-speech system to replace at least a portion of said audio output with a portion of said audio input.

20. The system of claim 17 further comprising:
a database and wherein said modification component is for modifying said database, wherein a process selected from a group consisting essentially of dictionary adaptation and dictionary augmentation is performed.

21. The system of claim 20 wherein database comprises a component of said first system.

22. The system of claim 20 wherein said database comprises a component of said second system.

23. The system of claim 20 wherein said wherein said database comprises a common component of said first system and said second system.

24. The system of claim 17 wherein said first system comprises an automatic speech recognition system, said second system comprises a text-to-speech system, and wherein said modification component is for modifying a text output of said automatic speech recognition system based upon a text input of said text-to-speech system.

25. A modification component for improving the fidelity of text-to-speech and automatic speech recognition systems, said system comprising:
a first input accessor for accessing a first input for a first system in first modality, and wherein said first system generates a first output corresponding to said first input;
a second input accessor for accessing a second input for a second system in a second modality; and
a determining component for determining that said first input and said second input are unrecognizable and, determining to treat said first input and said second input as the same word by comparing the first input and the second input with each other and, if it is determined to treat said first input and said second input as the same word, then for causing said first system to modify subsequent output of said first system based upon said second input.

26. The modification component of claim 25 wherein said first system comprises said text-to-speech system, said second system comprises said automatic speech recognition system, and wherein said modification component is for modifying an audio output of said text-to-speech system based upon an audio input of said automatic speech recognition system.

27. The modification component of claim 25 wherein said determining component is configured to initiate modifying a database component, wherein a process selected from a group consisting essentially of dictionary adaptation and dictionary augmentation is performed.

28. The modification component of claim 27 wherein said database component comprises a component of said first system.

29. The modification component of claim 27 wherein said database component comprises a component of said second system.

30. The modification component of claim 27 wherein said database component comprises a common component of said first system and said second system.

31. The modification component of claim 25 wherein said determining component is configured to substitute at least a portion of said first output with said second input.

32. The modification component of claim 25 wherein said determining component is configured to initiate a process selected from a group consisting essentially of dictionary adaptation and dictionary augmentation is performed.

33. The modification component of claim 25 wherein said first system comprises said automatic speech recognition system, said second system comprises said text-to-speech system, and wherein said modification component is for modifying a text output of said automatic speech recognition system based upon a text input of said text-to-speech system.

* * * * *

UNITED STATES PATENT AND TRADEMARK OFFICE
CERTIFICATE OF CORRECTION

| | | |
|---|---|---|
| PATENT NO. | : 8,463,611 B2 | Page 1 of 1 |
| APPLICATION NO. | : 10/965540 | |
| DATED | : June 11, 2013 | |
| INVENTOR(S) | : Sumit Roy et al. | |

It is certified that error appears in the above-identified patent and that said Letters Patent is hereby corrected as shown below:

In the Claims:

In column 14, line 47, in Claim 23, delete "wherein said wherein said" and insert -- wherein said --, therefor.

In column 16, line 13, in Claim 32, after "augmentation" delete "is performed".

Signed and Sealed this
Nineteenth Day of November, 2013

Teresa Stanek Rea
*Deputy Director of the United States Patent and Trademark Office*